United States Patent [19]
Oda

[11] Patent Number: 5,194,274
[45] Date of Patent: Mar. 16, 1993

[54] ICE CONFECTIONERY
[75] Inventor: Koji Oda, Gamagori, Japan
[73] Assignee: Mermaid Co., Ltd., Japan
[21] Appl. No.: 785,083
[22] Filed: Oct. 30, 1991

[30] Foreign Application Priority Data

May 16, 1991 [JP] Japan ................................. 3-139515

[51] Int. Cl.$^5$ ............................................. A23G 9/02
[52] U.S. Cl. ................................... 426/101; 426/565; 426/130; 426/249
[58] Field of Search ................. 426/101, 249, 130, 565

[56] References Cited

U.S. PATENT DOCUMENTS

| | | | |
|---|---|---|---|
| 1,167,563 | 1/1916 | Ingram | 426/249 |
| 2,747,525 | 5/1956 | Lund | 426/249 |
| 3,411,921 | 11/1968 | Shifrin | 426/130 |
| 4,310,559 | 1/1982 | Mita et al. | 426/249 |
| 4,507,326 | 3/1985 | Tarantino | 426/249 |

FOREIGN PATENT DOCUMENTS

| | | | |
|---|---|---|---|
| 3248351 | 10/1988 | Japan | 426/101 |
| 917344 | 2/1963 | United Kingdom | 426/249 |
| 1402994 | 8/1975 | United Kingdom | 426/249 |

Primary Examiner—Jeanette Hunter
Attorney, Agent, or Firm—Andrus, Sceales, Starke & Sawall

[57] ABSTRACT

The present invention provides an ice confectionery comprising a fist layer of only crushed ice particles, a second layer including crushed ice particles and impregnated with a syrup and a third layer of ice cream disposed between the first and second layers, the third layer effectively separating the second layer from the first layer such that the syrup will not move from the second layer into the first layer.

7 Claims, 1 Drawing Sheet

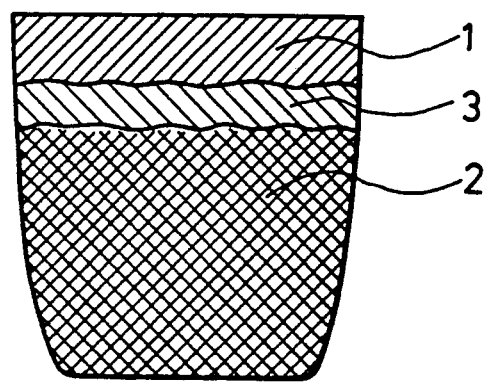

ICE CONFECTIONERY

BACKGROUND OF THE INVENTION

1. Field of the Invention

The present invention relates to a novel and improved ice confectionery.

2. Description of the Related Art

In the past, many types of ice confectionery were proposed and sold. There is one of such ice confections which comprises a first layer of crushed ice particles and a second layer of crushed ice particles, the second layer being impregnated with a syrup and located directly adjacent the first layer. In such an ice confections, the syrup moves from the second layer into the first layer during the manufacturing process. It is thus impossible to maintain the first layer of only crushed ice particles dry.

In order to overcome such a problem, the prior art first freeze the second ice particle layer containing the syrup completely. Thereafter, the first ice particle layer containing no syrup is formed over the second layer which has been completely frozen. This can maintain the first layer dry during the manufacturing process. However, this manufacturing process provides less efficiency in production and requires a large-scaled producing installation for mass-production.

Furthermore, it has been found that when the temperature of products rose during handling or shipping, the frozen syrup first melts and moves to the first layer of only crushed ice since the melting point of the syrup is lower than that of the crushed ice particles. If such a molten product is re-frozen, the first wet layer will be frozen against the intention of maintaining the first layer dry.

It is therefore an object of the present invention to provide a novel and improved ice confectionery which can prevent the syrup in the second layer from moving into the first layer to maintain the first layer dry during the manufacturing process and/or the handling and shipping process.

SUMMARY OF THE INVENTION

To this end, the present invention provides an ice confectionery which comprises a fist layer of only crushed ice particles, a second layer including crushed ice particles and impregnated with a syrup and a third layer of ice cream disposed between the first and second layers.

BRIEF DESCRIPTION OF THE DRAWING

A single FIGURE is a vertical cross-section of an ice confection constructed in accordance with the present invention.

DETAILED DESCRIPTION OF PREFERRED EMBODIMENT

Referring to the drawing, an ice confection comprises a first layer 1 consisting of only crushed ice particles, a second layer 2 consisting of crushed ice particles and a syrup impregnated between the crushed ice particles, and a third layer 3 of ice cream interposed between the first and second layers 1, 2.

The third layer 3 serves as a barrier for preventing the syrup from moving to the first layer 1 of only crushed ice particles during the manufacturing, handling and/or shipping process to maintain the first layer dry.

In order to manufacture the ice confections in a continuous manner, the second layer consisting of the crushed ice particles and the syrup contained therebetween must be have a flowability. For such a purpose, the solid components of the syrup in the second layer 2 is preferably ranged between 30% and 70% by weight and the weight rate of syrup to crushed ice particles mixed therewith is 1.0:2.5. After mixing, it is desirable that the second layer 2 will be flowable and charged into a vessel such as a cup or the like as tightly as possible. If the flowability of the syrup is too high, it becomes difficult to prevent the syrup from moving into the first layer.

In order to give a pleasure to customers, it is desirable that the particle diameter of the crushed ice is equal to or less than 10 mm and preferably 5 mm. The crushed ice particles may made from a mass of ice cooled to a temperature as low as possible. If crushed ice particles cooled up to $-15$ deg C. or less are charged into a cup, they can be easily maintained dry.

If the ice confections are produced at room temperature in the continuous manner and when the first and second layers are in direct contact with each other, the syrup will moves easily from the second layer into the first layer. Thus, the crushed ice particles in the first layer cannot be maintained dry.

In accordance with the present invention, an additional or third layer is interposed between the first and second layers so as to prevent any movement of the syrup from the second layer into the first layer. In order to prevent the third layer from melting the adjacent layers, the third layer should have a temperature below zero deg C. which is the melting point of the ice. Furthermore, the third layer must have a flowability to accomplish the continuous production and should not be impregnated with the syrup. The specific weight of the third layer is desirably smaller than that of the syrup. Still further, the third layer must have such a softness as can be easily scooped by a spoon.

The ice cream is normally ranged between $-3.0$ deg C. and $-7.0$ deg C. during being charged. Thus, the crushed ice particles will not be molten by contacting the ice cream. The ice cream has a flowability suitable in the continuous production. The syrup will not move from the second layer into the third or ice cream layer unless the latter is molten. The specific weight of the ice cream can be freely adjusted toward its lower level by regulating the rate of air to the ice cream. Since the ice cream is held soft even if it has been frozen, the ice confections of the present invention can be eaten by customers with a pleasure. Since the ice cream is made of milk, the combination of tastes can be varied more broadly. The amount of the ice cream to be charged can be freely selected, but may be sufficient if the second layer is covered with the ice cream until the ice confection is completely frozen.

In order to protect from any increase of temperature during the handling and/or shipping, any suitable stabilizer may be added into the ice cream to increase its integrity and water retention for some suppression of the degradation.

I claim:

1. An ice confectionery comprising a first layer of only crushed ice particles, a second layer including crushed ice particles and impregnated with a syrup, and a third layer of ice cream disposed between the first and second layers, wherein aid third layer serves as a barrier for preventing the syrup from moving from the second layer to the first layer.

2. An ice confectionery as defined in claim 1 wherein said second layer has a flowability.

3. An ice confectionery as defined in claim 2 wherein the solid components of said syrup in said second layer is ranged between 30% and 70% by weight and the weight rate of syrup to crushed ice particles mixed therewith is 1.0:2.5.

4. An ice confectionery as defined in claim 2 wherein after mixing, said second layer is flowable and charged into a vessel such as a cup or the like as tightly as possible.

5. An ice confectionery as defined in claim 1 wherein the particle diameter of the crushed ice particles is equal to or less than 10 mm.

6. An ice confectionery as defined in claim 4 wherein the particle diameter of the crushed ice particles is equal to or less than 5 mm.

7. An ice confectionery as defined in claim 1 wherein said crushed ice particles are made from a mass of ice cooled to a temperature to $-15$ deg C. or less.

* * * * *

UNITED STATES PATENT AND TRADEMARK OFFICE
CERTIFICATE OF CORRECTION

PATENT NO. : 5,194,274
DATED : March 16, 1993
INVENTOR(S) : KOJI ODA It is certified that error appears in the above-identified patent and that said Letters Patent is hereby corrected as shown below:

Claim 1, Col. 3, Line 1, delete "aid" and insert -- said --; Claim 6, Col. 4, Line 6, delete "4" and insert -- 1 --.

Signed and Sealed this

Twenty-third Day of November, 1993

Attest:

BRUCE LEHMAN

*Attesting Officer*  *Commissioner of Patents and Trademarks*